United States Patent
Nickels

(10) Patent No.: US 7,087,262 B2
(45) Date of Patent: Aug. 8, 2006

(54) PROCESS FOR MANUFACTURING DEHYDRATED PRECOOKED FLAKED PINTO BEANS

(75) Inventor: Nicky Chad Nickels, Muleshoe, TX (US)

(73) Assignee: Triple Nickel, Inc., Muleshoe, TX (US)

( * ) Notice: Subject to any disclaimer, the term of this patent is extended or adjusted under 35 U.S.C. 154(b) by 70 days.

(21) Appl. No.: 11/109,307

(22) Filed: Apr. 19, 2005

(65) Prior Publication Data

US 2005/0238787 A1   Oct. 27, 2005

Related U.S. Application Data

(60) Provisional application No. 60/563,957, filed on Apr. 21, 2004.

(51) Int. Cl.
*A23L 1/20* (2006.01)
(52) U.S. Cl. .............. 426/634; 426/392; 426/457; 426/460; 426/465; 426/508; 426/523; 426/524
(58) Field of Classification Search ............. 426/629, 426/634, 392, 455–457, 459–461, 465, 506–511, 426/523, 524
See application file for complete search history.

(56) References Cited

U.S. PATENT DOCUMENTS

| | | | | |
|---|---|---|---|---|
| 1,088,741 A | * | 3/1914 | Stephens | 426/634 |
| 1,813,268 A | * | 7/1931 | Bachler | 426/634 |
| 4,735,816 A | * | 4/1988 | Sterner et al. | 426/457 |
| 4,871,567 A | * | 10/1989 | Sterner et al. | 426/461 |
| 4,943,441 A | * | 7/1990 | McCabe | 426/511 |
| 5,124,170 A | * | 6/1992 | Sterner et al. | 426/634 |
| 5,151,285 A | * | 9/1992 | Williams et al. | 426/241 |
| 5,213,831 A | * | 5/1993 | Leggott et al. | 426/241 |
| 5,980,971 A | * | 11/1999 | Walsh | 426/634 |
| 6,482,457 B1 | * | 11/2002 | Margolis | 426/459 |
| 6,808,732 B1 | * | 10/2004 | Boullin et al. | 426/471 |

FOREIGN PATENT DOCUMENTS

JP        2001061429 A   *   3/2001

* cited by examiner

*Primary Examiner*—Drew Becker
(74) *Attorney, Agent, or Firm*—Michael A O'Neil

(57) ABSTRACT

A process for manufacturing dehydrated precooked flaked pinto beans begins with cleaning a quantity of beans. The cleaned beans are then pressure cooked. Following cooking, the beans are deposited on a perforated conveyor for transportation through a first dehydrator which reduces the moisture content of the beans to about 20%. The cooked dehydrated pinto beans are then directed through a roller mill to convert the beans into flakes. Alternative to being dehydrated in a first dehydrator before being converted into flakes, the beans may be separated on a water separating conveyor and not undergo any dehydration. The cooked dehydrated bean flakes are then transported through a dehydrator which reduces the moisture content thereof to less than about 10%.

4 Claims, 2 Drawing Sheets

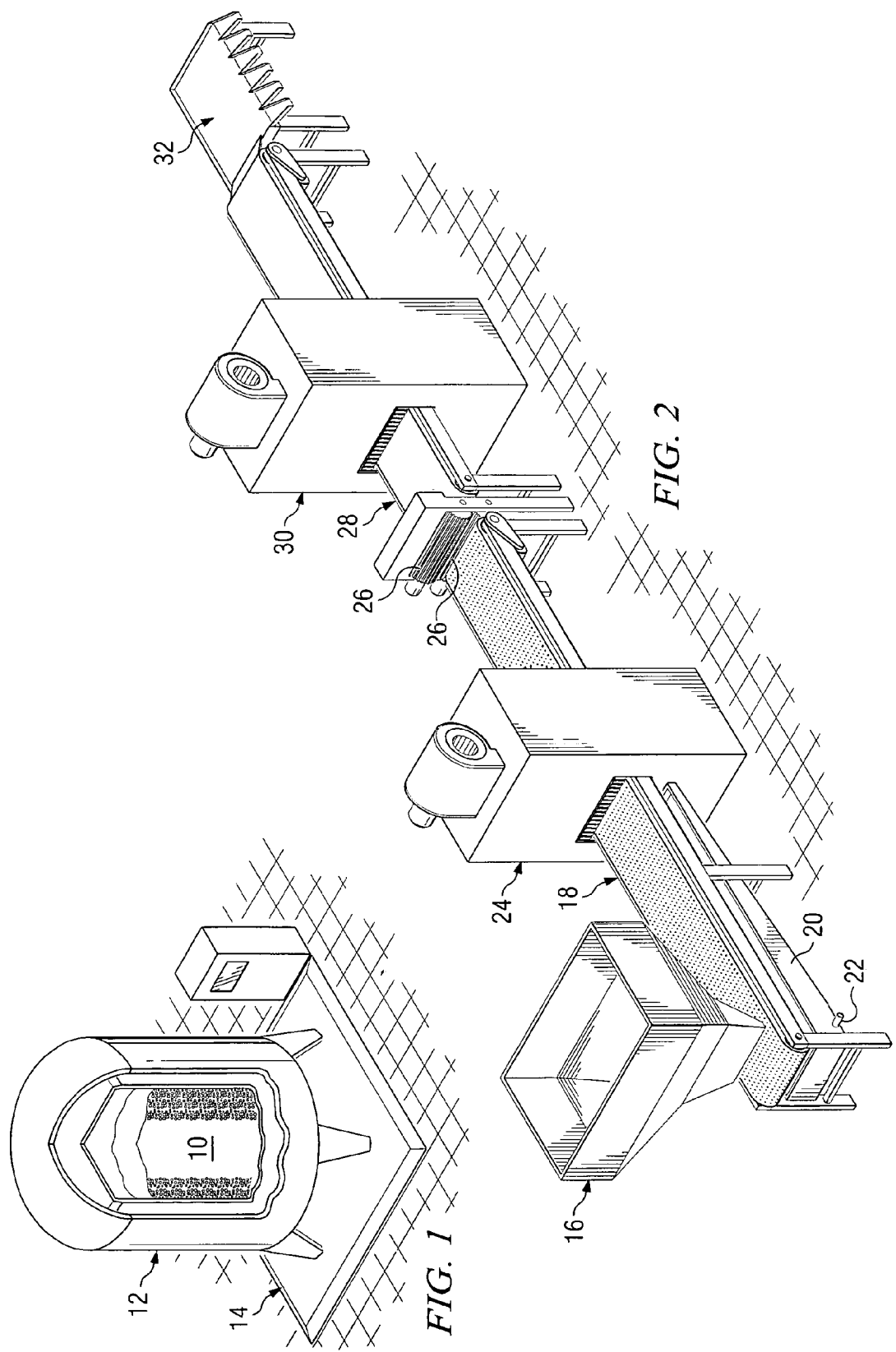

PROCESS FOR MANUFACTURING DEHYDRATED PRECOOKED FLAKED PINTO BEANS

CLAIM OF PRIORITY

Applicant claims priority based on provisional patent application Ser. No. 60/563,957, filed Apr. 21, 2004.

TECHNICAL FIELD

This invention relates generally to the processing of pinto beans and other legumes for human consumption, and more particularly to an improved process for manufacturing dehydrated precooked flaked pinto beans.

BACKGROUND AND SUMMARY OF THE INVENTION

Dehydrated precooked pinto beans have heretofore been manufactured into chipped beans by first cooking the beans in a device that is similar to a conventional roaster. After cooking, the beans are pumped out of the cooking device and into trays. At this point the whole beans are in a liquid state. While the cooked pinto beans are in the trays they are quick frozen. The frozen blocks of beans are directed through a chipper and are then dehydrated. The finished dehydrated precooked chipped pinto beans are then packaged for sale.

The foregoing and other processes for preparing dehydrated precooked chipped pinto beans are deficient in that the resulting product is relatively low in nutritional value. The present invention overcomes the foregoing and other difficulties which have long since characterized the prior art by providing a process for manufacturing dehydrated precooked flaked pinto beans which results in virtually no loss of nutritional value and shrinkage of less than 1%.

In accordance with the broader aspects of the invention, a carefully prepared mixture of cleaned raw pinto beans and water is cooked in a steam jacketed pressure vessel. The cooking process results in absorption of substantially all of the water from the mixture into the pinto beans. Following cooking, the pinto beans are discharged from the pressure vessel into a holding hopper which directs the cooked pinto beans onto a perforated stainless steel conveyor.

The perforated stainless steel conveyor transports the cooked pinto beans through a dehydrator which reduces the moisture content of the cooked pinto beans to about 20%. Following dehydration the pinto beans are directed through corrugated rollers which press the cooked pinto beans into flakes. The cooked and dehydrated pinto bean flakes are then directed through a second dehydrator which reduces the moisture content of the pinto beans flakes to between about 10% and about 3%. After passing through the second dehydrator, the dehydrated precooked flaked pinto beans are packaged for distribution and sale.

A second embodiment of the present invention comprises an alternate sequence of steps and required equipment. In accordance with the specific aspects of the second embodiment, the beans are first processed through a flume destoner where the beans are cleansed and pre-soaked utilizing heated water. From the flume destoner, the beans are discharged into a full vacuum kettle along with a predetermined quantity of water. Steam is then injected into the kettle for pressure cooking the beans and heating the water therein to create more steam. The steam is maintained at about 13.5 psi thereby cooking the beans in a period of about 40 minutes.

The cooked beans are then discharged into a holding hopper which thereafter discharges a regulated flow of beans onto a vibrating water separating conveyor utilizing heated water for separation of the beans thereon. As the beans reach the end of the conveyor, heated oil is sprayed thereover prior to the beans entering a roller mill. The roller mill utilizes smooth heated rollers for converting the cleaned, cooked beans into flakes. The combination of the oil-misted beans with the smooth heated roller facilitates softening and stretching of the bean's skin ultimately resulting in a more tender, more flavorful bean product.

The roller mill discharges the bean flakes onto a perforated stainless steel conveyor which directs the beans through a dehydrator wherein the moisture content of the bean flakes is reduced to between about 7% and about 9%. The bean flakes are then directed through a cooler which circulates ambient air across the dehydrated bean flakes to cool then flakes to a suitable temperature for packaging.

BRIEF DESCRIPTION OF THE DRAWINGS

A more complete understanding of the present invention may be had by reference to the following Detailed Description when taken in connection with the accompanying Drawings, wherein:

FIG. 1 is a perspective view of a steam jacketed pressure vessel useful in the cooking of pinto beans in accordance with the process of the present invention;

FIG. 2 is a perspective view illustrating various devices useful in carrying out successive steps comprising the process of the present invention.

DETAILED DESCRIPTION

Figure 3:
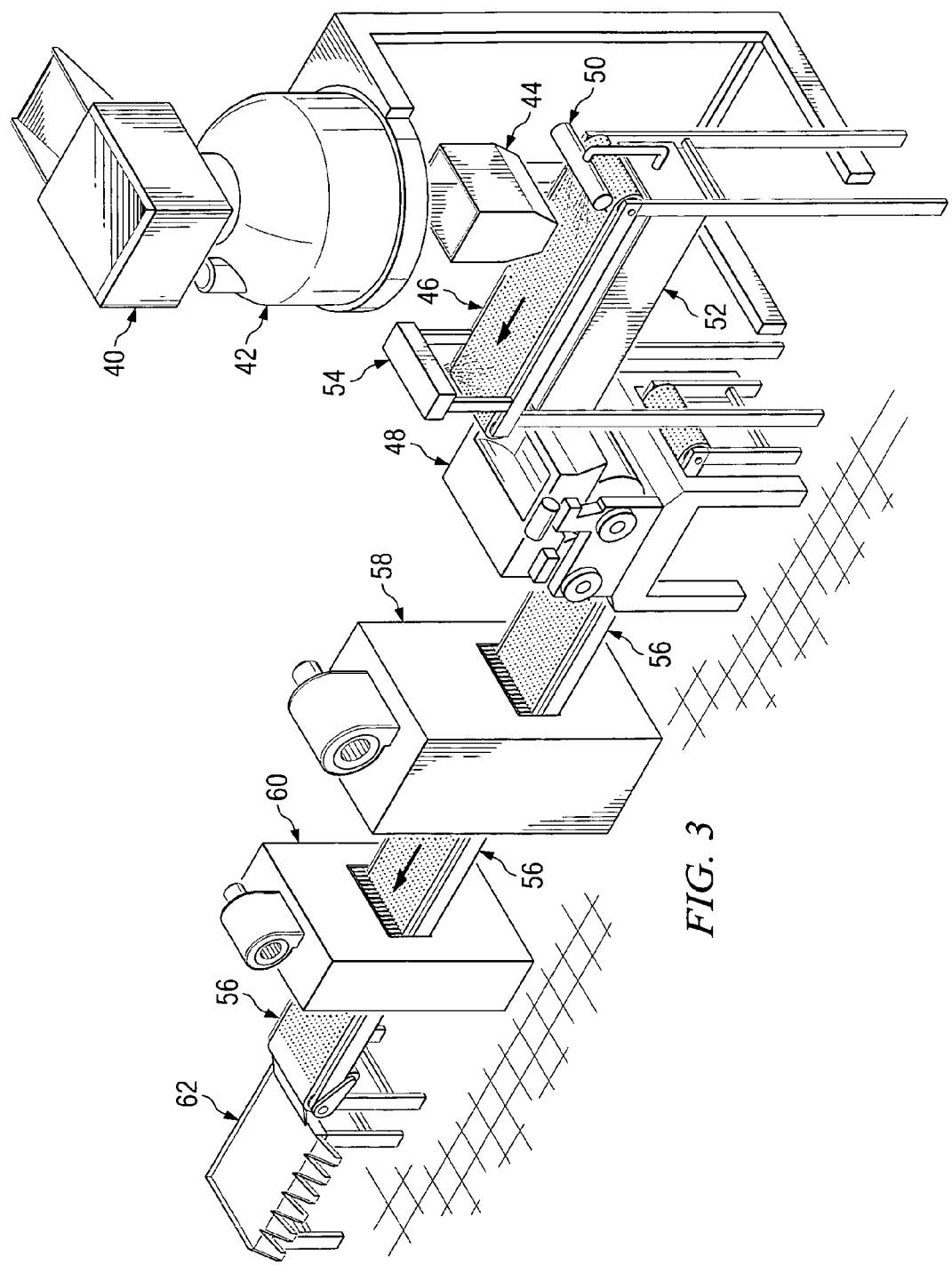
FIG. 3 is a perspective illustrating alternative devices useful in carrying out an alternative set of successive steps comprising the process of the present invention.

FIGS. 1 and 2 illustrate a plurality of devices useful in carrying out the steps comprising the process of the present invention. The process begins with the cleaning of a quantity of pinto beans. The cleaned pinto beans 10 are then introduced into a steam jacketed pressure vessel 12 along with a predetermined quantity of water. The pressure vessel 12 is preferably supported on a scale 14 so that the ratio of pinto beans to water can be accurately determined.

Within the pressure vessel 12 the pinto bean/water mixture is cooked at a minimum temperature of 230° F. for a period of about 40 to 45 minutes at a pressure of about 15 psi. At the end of the cooking process substantially all of the water from the pinto bean/water mixture is absorbed into the cooked pinto beans.

Following the cooking step the now cooked pinto beans are discharged from the pressure vessel 12 onto a stainless steel holding hopper 16. The hopper 16 discharges the cooked pinto beans onto a perforated stainless steel conveyor 18. Any excess moisture from the cooked pinto beans passes through the perforations of the conveyor 18 into a catch basin 20 and from the catch basin 20 into a drain 22.

The perforated conveyor 18 transports the cooked pinto beans through a first dehydrator 24. The dehydrator 24 includes a fan and suitable heating elements which may be similar to those used in an ordinary household oven. The fan directs heated air into engagement with the pinto beans and through the perforated conveyor which supports the pinto beans thereby assuring appropriate drying of the cooked pinto beans. Preferably the heated air is recirculated to the fan after passing through the perforated conveyor 18. The function of the dehydrator 24 is to reduce the moisture content of the cooked pinto beans to about 20%.

After passing through the dehydrator 24, the cooked and dehydrated pinto beans are directed through a pair of opposed, corrugated stainless steel rollers 26. The function of the rollers 26 is to press the cooked and dehydrated pinto beans into flakes.

In actual practice it has been found that a moisture content of about 20% is preferable for forming cooked pinto beans into flakes. Thus, if the moisture content of the cooked pinto beans is substantially less than 20%, the pinto beans will tend to shatter during the flaking procedure. It has also been determined that the pinto bean flakes which are formed by the rollers 26 should be as thin as possible in order to facilitate subsequent re-hydration of the pinto beans.

After passing through the corrugated stainless steel rollers 26 the pinto beans, now in flake form, are received on a conveyor 28. The conveyor 28 transports the pinto bean flakes through a second dehydrator 30 which is substantially identical in construction and function to the dehydrator 24 as described above. The second dehydrator 30 reduces the moisture content of the pinto bean flakes to between about 10% and about 3%. After passing through the second dehydrator 30 the pinto bean flakes are transported by the conveyor 28 to a suitable packaging apparatus 32 for packaging and shipping to the ultimate consumer.

FIG. 3 illustrates an alternative sequence of steps and alternative devices which may be used to manufacture dehydrated precooked flaked beans. The process begins with raw pinto beans being placed in a flume destoner 40 with a predetermined quantity of water for cleaning and pre-soak. Inside the flume destoner 40 the water is heated to about 210° F. The heated water in the destoner 40 not only cleans the beans but also facilitates a pre-soak of the beans in a lesser amount of time than required when using non-heated water to pre-soak the beans. The pre-soaked, cleaned beans are then introduced into a full vacuum kettle 42 for cooking. The full vacuum kettle 42 employed in the method of the present invention comprises a vacuum sealed tank in which the beans and water are placed. A boiler generates steam which is injected into the tank to apply pressure directly to the beans and to heat the water therein for additional steam. The steam is maintained at about 13.5 psi thereby cooking the beans at a minimum temperature of about 230° F. in a period of about 40 minutes.

Below the full vacuum kettle 42 is a stainless steel holding hopper 44 which receives the beans from the full vacuum kettle and thereafter discharges the beans onto a vibrating water separating conveyor 46 which separates the beans while conveying the beans to a roller mill 48 to be converted to flakes. The water separating conveyor 46 may be vibrated by an eccentric or other vibrating means known to those skilled in the art of manufacturing food processing equipment.

A nozzle 50 located at the proximal end of the water separating conveyor 46 distributes hot water heated to about 200° F. over the beans as they travel along the length thereof facilitating substantially complete separation of the beans. The hot water distributed over the beans prevents the beans from smearing while on the water separating conveyor 46 facilitating relatively uniform flake formation and eventually a more tender bean having more taste when reconstituted by water. Excess water is discarded into a waste water tank 52 located beneath the water separating conveyor 46.

At the distal end of the conveyor is oil mister 54 for applies a light mist of hot oil onto the beans before they are discharged into the roller mill 48. The oil softens the bean's skin further facilitating a substantially uniform flake formation and resulting in a more tender and flavorful bean product. A spice fennel may also be employed to apply spices onto the beans before entering the roller mill 48. Applying spices to the beans neutralizes the starches in the bean, resulting in a less gaseous bean product. Additionally, the spices applied to the beans may be employed to create a spice flavored bean product.

The roller mill 48 processes the cleaned, separated beans into flakes. The roller mill 48 used in the practice of the present invention may be a cereal mill employing smooth heated rollers therein such as a modified M-Series Cereal Flaker mill manufactured by Ferrell-Ross, or other similar milling machines known to those skilled in the food processing industry as suitable for milling foodstuffs into flakes. Heated rollers inside the roller mill 48 facilitate softening and stretching of the oiled bean's skin thereby preventing the beans and resulting flakes from accumulating on the rollers and resulting in a more tender bean product.

After passing through the roller mill 48, the bean flakes are directed onto a perforated stainless steel conveyor 56 which transports the bean flakes through a dehydrator 58. The bean flakes are directed through the dehydrator 58 for removal of the moisture therefrom. The dehydrator 58 employs fans that circulate air across steam coils heated to over 200° F. and thereafter over the bean flakes traveling therethrough to reduce the moisture content of the bean flakes to between about 7% and about 9%. The air is thereafter re-circulated back across the steam coils for removal of any moisture contained therein.

After passing through the dehydrator, the conveyor 56 directs the dehydrated bean flakes through a cooler 58. The cooler 58 circulates ambient air across the bean flakes in order to cool them to ambient temperature for packaging. From the cooler 58, the conveyor 56 conveys the cooled, dehydrated bean flakes to a collection bin and suitable packaging apparatus 62. The cooked, dehydrated bean flakes are then packaged and shipped to the ultimate customer.

Prior to consumption the dehydrated precooked flaked beans of the present invention are preferably re-hydrated. This is accomplished by mixing a quantity of boiling water with an equal quantity of dehydrated precooked flaked beans. The bean flake/water mixture is then stirred and simmered for approximately five minutes whereupon the re-hydrated pinto beans are ready for consumption.

The steps of the present invention have been discussed in conjunction with pinto beans, but the process of the present invention may be equally employed with legumes of all types. The process of the present invention may also be used in conjunction with shelled beans and peas by adding an apparatus for removing the beans or peas from their pods prior to the cleansing and pre-soaking step.

Although preferred embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

What is claimed is:

1. A process for manufacturing dehydrated precooked flaked pinto beans comprising the steps of:
   providing a steam jacketed pressure vessel;
   providing a quantity of cleaned pinto beans;
   providing a quantity of water;
   positioning the quantity of pinto beans and the quantity of water in the steam jacketed pressure vessel;

employing the steam jacketed pressure vessel to heat the pinto beans and water contained therein thereby cooking the pinto beans;

providing a holding hopper;

discharging the cooked pinto beans from the steam jacketed pressure vessel into the holding hopper;

providing a perforated conveyor;

discharging the pinto beans from the holding hopper onto the perforator conveyor;

providing a first dehydrator;

utilizing the perforated conveyor to transport the cooked pinto beans through the first dehydrator;

utilizing the dehydrator to reduce the moisture content of the cooked pinto beans to approximately 20%;

providing a pair of opposed corrugated rollers;

directing the cooked dehydrated pinto beans between the opposed corrugated rollers and thereby converting the cooked, dehydrated pinto beans into flakes;

providing a second dehydrator;

directing the cooked dehydrated pinto bean flakes through the second dehydrator and thereby reducing the moisture content thereof to between about 10% and about 3%; and packaging the precooked dehydrated flaked pinto beans for distribution and sale following the second dehydration step.

2. A process for manufacturing dehydrated precooked beans comprising the steps of:

providing a quantity of raw beans;

providing means for cleaning and pre-soaking the quantity of raw beans;

providing a quantity of heated water;

positioning the quantity of beans and the quantity of water in the cleaning and pre-soaking means;

utilizing the cleaning and pre-soaking means and the quantity of water therein to clean and pre-soak the beans;

providing means for pressure cooking the beans;

discharging the clean, pre-soaked beans from the cleaning and pre-soaking means into the pressure cooking means;

providing a second quantity of water;

positioning the clean, pre-soaked beans and the second quantity of water in the pressure cooking means;

utilizing the pressure cooking means to heat the beans and the water contained therein thereby cooking the beans;

providing a holding hopper;

discharging the cooked beans from the pressure cooking means into the holding hopper;

providing a separating conveyor;

discharging the cooked beans from the holding hopper onto the separating conveyor;

utilizing the separating conveyor to separate the beans;

providing means for applying a mist of oil onto the separated, cooked beans;

utilizing the misting means to mist oil onto the separated, cooked beans at the distal end of the separating conveyor;

providing a roller mill having smooth, heated rollers;

discharging the misted, separated beans into the roller mill;

utilizing the roller mill and heated rollers therein to convert the separated, cooked beans into flakes;

providing a perforated conveyor;

discharging the bean flakes onto the perforated conveyor;

providing a dehydrator;

providing means for cooling the bean flakes;

utilizing the perforated conveyor to direct the beans through the dehydrator and the cooling means;

utilizing the dehydrator to reduce the moisture content of the bean flakes to less than about 9%;

utilizing the cooling means to cool the dehydrated bean flakes to ambient temperature; and packaging the cooled, dehydrated bean flakes for distribution and sale.

3. The process for manufacturing dehydrated precooked beans according to claim 2 further comprising the steps of:

providing a quantity of heated water for use in conjunction with the separating conveyor;

providing means for spraying the heated water across the beans on the separating conveyor; and the water sprayed over the beans on the separating conveyor facilitating substantially complete separation of the beans thereon.

4. The process for manufacturing dehydrated precooked beans according to claim 2 wherein the cleaning and pre-soaking means is a flume destoner.

* * * * *